(12) United States Patent
Samad et al.

(10) Patent No.: US 9,734,644 B2
(45) Date of Patent: Aug. 15, 2017

(54) WIRELESS CAMERA FACILITATED BUILDING SECURITY

(71) Applicant: The Chamberlain Group, Inc., Elmhurst, IL (US)

(72) Inventors: Zeina Abdul Samad, Chicago, IL (US); Neeraj Soparawala, Evergreen Park, IL (US); Kejia Liu, Chicago, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 290 days.

(21) Appl. No.: 14/695,901

(22) Filed: Apr. 24, 2015

(65) Prior Publication Data

US 2015/0312531 A1 Oct. 29, 2015

Related U.S. Application Data

(60) Provisional application No. 61/984,461, filed on Apr. 25, 2014.

(51) Int. Cl.
*H04N 7/18* (2006.01)
*G07C 9/00* (2006.01)
*G08B 13/196* (2006.01)

(52) U.S. Cl.
CPC ... *G07C 9/00079* (2013.01); *G08B 13/19695* (2013.01); *H04N 7/186* (2013.01)

(58) Field of Classification Search
None
See application file for complete search history.

(56) References Cited

U.S. PATENT DOCUMENTS

2013/0017812 A1* 1/2013 Foster ............... H04L 12/2825
455/417
2013/0188050 A1* 7/2013 Winget ................. G08G 1/168
348/148

* cited by examiner

*Primary Examiner* — Heather Jones
(74) *Attorney, Agent, or Firm* — Fitch Even Tabin & Flannery LLP (57) ABSTRACT

A security system permits limited access into a building for authorized visitors. The security system includes an access interface pad installable at a building entryway and a camera device releasably secured to the access interface pad with an anchor. The anchor allows the camera device to detach from the access interface pad in response building access being authorized by the security system so that an authorized visitor can wear the camera device while in the secured building. The security system can both communicate with a remote device so that data captured by the camera can be transmitted to a user in real time and automatically analyze information from the camera with respect to certain security parameters.

23 Claims, 5 Drawing Sheets

WIRELESS CAMERA FACILITATED BUILDING SECURITY

RELATED APPLICATIONS

This application claims the benefit of U.S. provisional application Ser. No. 61/984,461 filed Apr. 25, 2014, titled "Camera Operated Home Entry System," which is incorporated by reference in its entirety herein.

TECHNICAL FIELD

The present disclosure generally relates to building security systems. More specifically, the present disclosure relates to security systems that provide remote building access to authorized personnel.

BACKGROUND

Many businesses provide services at the home or residence of customers. In some situations, these services may involve the service providers working within customer homes. For example, cable, internet, or other utility providers often provide service attendants to customer homes to install, repair, or otherwise attend to customer needs. As another example, parcel delivery services often request access to customer homes so that they can leave packages in a safe and secure location. To give access to service providers, a resident must typically wait at the home to open the door for the service providers. This can result in unproductive waiting time.

Permitting home access to visitors without requiring a resident to remain at the home presents many challenges. For example, it can be difficult to assure that the home remains locked and secured to unauthorized visitors while an authorized visitor is within the home. It can also be challenging to ensure that the authorized visitors act in an appropriate manner while in the home. Further, residents may wish to restrict locations of the home that the authorized visitors may access or the amount of time that the authorized visitors can be in the house.

SUMMARY

The present disclosure provides examples of a security system, or a home entry system, that authorizes limited access to a building. In one example, the security system comprises an access interface pad installable at a building entryway. The access interface pad comprises an input device that receives visitor identification information that can be used to authorize or refuse entry into the building. The security system also includes a wireless camera device that can capture digital images and wirelessly transmit the captured images. An anchor releasably secures the camera device to the access interface pad.

In operation, the security system can authorize or deny limited access to the building in response to the receipt of visitor identification information via the access interface pad. The anchor releases the camera device from the access interface pad in response to the security system authorizing building access. In some examples, the security system will communicate with a remote personal device (e.g., a cell phone, tablet computer, laptop computer, etc.) so that images captured by the camera can be transmitted to the personal device in real time.

So configured, the security system can be employed to selectively permit limited remote access to a building for certain authorized individuals. In one example of operation, a user can enter an access code at the access interface pad. If a proper access code is entered, the security system will allow the visitor to detach the camera device from the access interface pad. If the camera device is detached and properly placed on the visitor, the security system may then authorize limited access to the visitor, for example, by automatically unlocking or opening the door, deactivating an alarm, or "buzzing" the individual in.

In some examples, the security system will monitor the visitor and determine whether any safety criteria have been violated. For example, the security system may detect the distance between the camera device and the access interface pad, or it may monitor the time that the camera device has been removed from the access interface pad. If the distance or time exceeds a predetermined threshold, the security system may activate a security protocol, such as activating an alarm or alerting a security authority.

In some examples, the security system will take measures to ensure that the camera device remains attached to the authorized visitor, for example, by monitoring vibrations, body capacitance, body heat, heartbeat, or the like, to ensure that the authorized visitor did not remove the camera device. In some approaches, the security system will use the camera device to obtain digital images before, during, and/or after the authorized visitor is in the secured building. In this manner, the security system may communicate the information obtained by the camera device to a remote user, for example, via a remote computing device such as a smart phone or a tablet computer. In some examples, the security system will activate a safety protocol if the system detects that that one or more safety criteria has been violated.

DETAILED DESCRIPTION

The present disclosure describes various examples of security systems for buildings. In one example, the security system (which can be, for example, a home entry system) provides an interface pad that allows a visitor to request limited access into the secured building. If and when limited access is authorized, the security system can release a camera device that can attach to the authorized visitor, for example, by clipping to an article of the visitor's clothing. The camera device can capture digital images while the authorized visitor is within the secured building and transmit the captured digital images, through the security system, to a remote computing device such as a smart phone, a tablet computer, a laptop computer, or another computing device. In this manner, the building owner, a resident, a security agent, or another individual can monitor the authorized visitor while that visitor has access to the secured building.

Throughout this application the disclosed described camera device will be described as capturing "images" (or "digital images"). As used throughout this application, "images" can include still images, recorded videos, or both. In some examples, the "images" can also include other information, such as data, audio that accompanies, or is separate from, the still or video images, or digital files that are recorded, captured, or otherwise obtained by the camera device or the security system. For example, captured "images" can include data pertaining to the time, the date, or the location that the images were captured, identification information associated with the authorized visitor, or other information detected by sensors of the security system.

Figure 1:
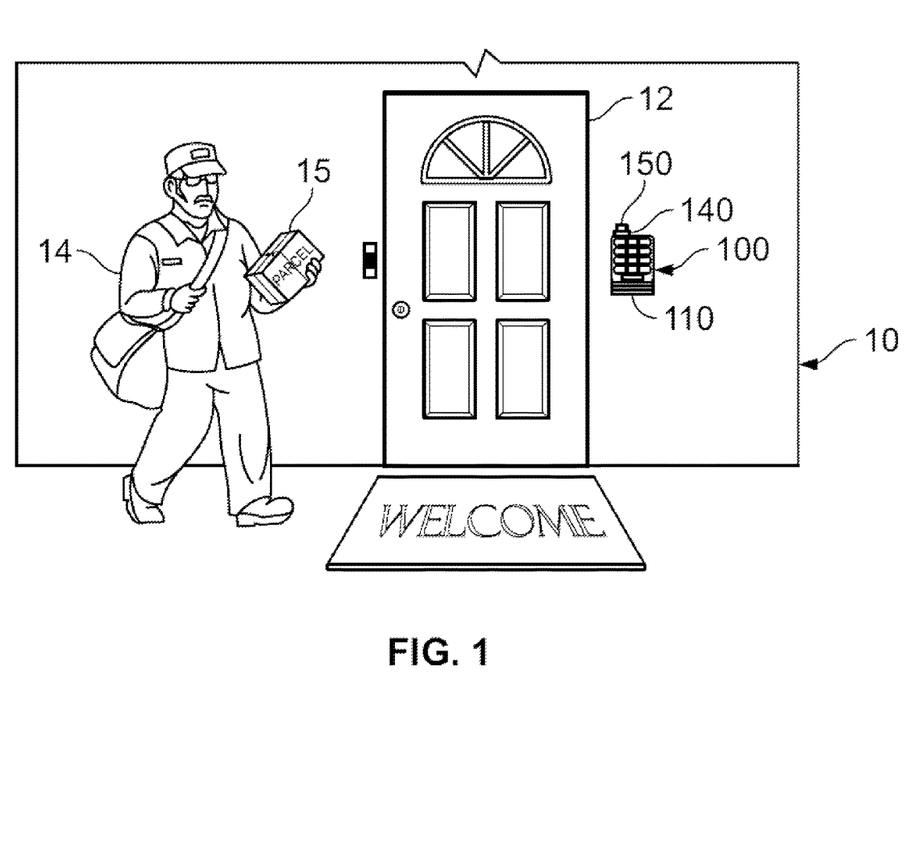
FIG. 1 shows a visitor seeking entry to a building secured with a security system in accordance with at least one example of the present disclosure.

Turning now to the drawings, FIG. 1 shows an example of a building 10 secured with a security system 100 of the present disclosure. A visitor 14 is shown at an entryway 12 or a doorway to the building 10.

The security system 100 includes an access interface pad 110 installed at or near the entryway 12. The access interface pad 110 provides an interface that allows a visitor to enter visitor identification information or otherwise request authorization for building access.

A camera device 150 is releasably attached to the access interface pad 110 via an anchor 140. In operation, in response to receiving visitor identification information, the security system may authorize building access. When the security system 100 authorizes building access, the anchor 140 will release the camera device 150 so that the camera can then be attached to the authorized visitor 14.

In some situations both a visitor 14 and a building owner can benefit from a security system that authorizes the visitor 14 with limited or temporary access to the secured building 10. For example, in FIG. 1, the visitor 14 is shown as a parcel delivery person carrying a parcel outside of the entryway 14 to the building 10. Without the presently described security system 100, if the visitor 14 arrives at a time when no one is present in the building 10, the visitor 14 will not be able to leave the parcel 15 inside of the building 10. That is, the visitor 14 will either need to depart with the parcel 15 and arrange for the parcel to be delivered at a later date or leave the parcel 15 unattended outside of the entryway 12, where it risks being by stolen by passersby. Both of these options are inconvenient and undesirable to both the visitor and the homeowner.

Accordingly, certain aspects of the presently described security system 100 can allow for the visitor 14 to have limited access to the building 10, while providing assurance that the visitor 14 does not take advantage of such access to the detriment of the building owner. In this manner, a parcel delivery person could access the building 10, for example, and leave a parcel 15 in a secured location behind a closed door.

The security system 100 provides assurance by employing the camera device 150, which the security system 100 provides to the visitor 14 before allowing the visitor to access to the building 10. In this manner, the camera device 10 can capture digital images while the visitor 14 has building access, and the security system 100 can transmit the captured digital images to a user via a remote computing device. Thus, the building owner can watch the visitor while limited access is authorized to assure that improper activity does not occur. In the event that the owner does observe improper activity, the owner may be able to take security measures such as initiating an alarm sequence or contacting a security authority such as the police.

Figure 2:
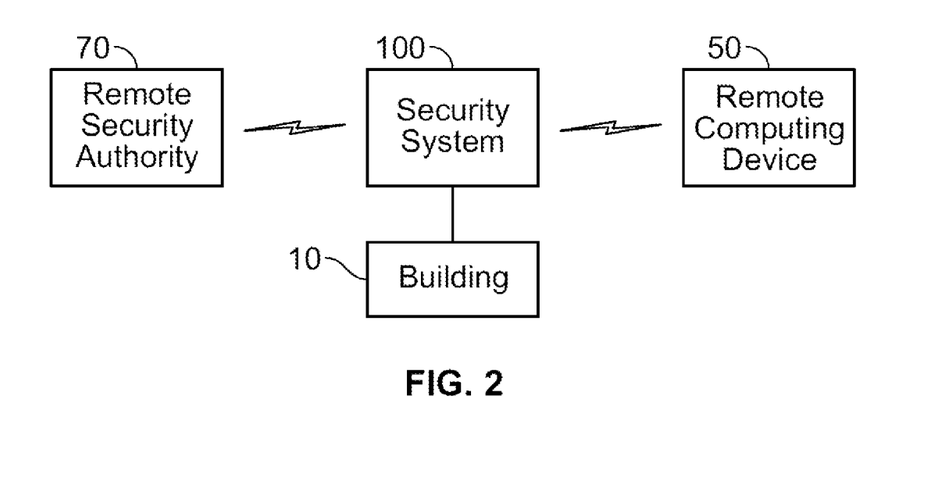
FIG. 2 is a block diagram of an example of a security system installed in a building, where the security system communicates with remote devices, entities, and/or facilities.

FIG. 2 is a block diagram showing an example security system 100 installed in a building 10. The security system 100 communicates wirelessly with a remote computing device 50, which can be, for example, a mobile communication device (e.g., a smart phone), a tablet computer, a laptop computer, or the like.

The remote computing device 50 can be installed with software operating an interface that interacts with and/or controls the security system 100. Alternatively, the camera device 50 may be able to access the security system 100 through a browser-based interface. Both of these options are known in the art. In either case, the security system 100 installed at the building 10 can communicate with a remote operator such as a home owner or resident through the remote computing device 50. The security system 100 can thus provide visitor identification information to the remote computing device 50, it can facilitate communication between the remote computing device 50 and a visitor at the building entryway 12, and it can allow the remote operator to authorize or deny access to the visitor.

In some examples, the security system 100 is also in wireless communication with a remote security authority 70, The remote security authority 70 can be, for example, a local police station, a local fire station, an alarm monitoring and/or dispatch company, or another third party responsible for handling security matters. In this manner, when a security issue is detected (e.g., improper use of authorized building access), the security system can notify the proper authority to take the appropriate security measures.

Figure 3:
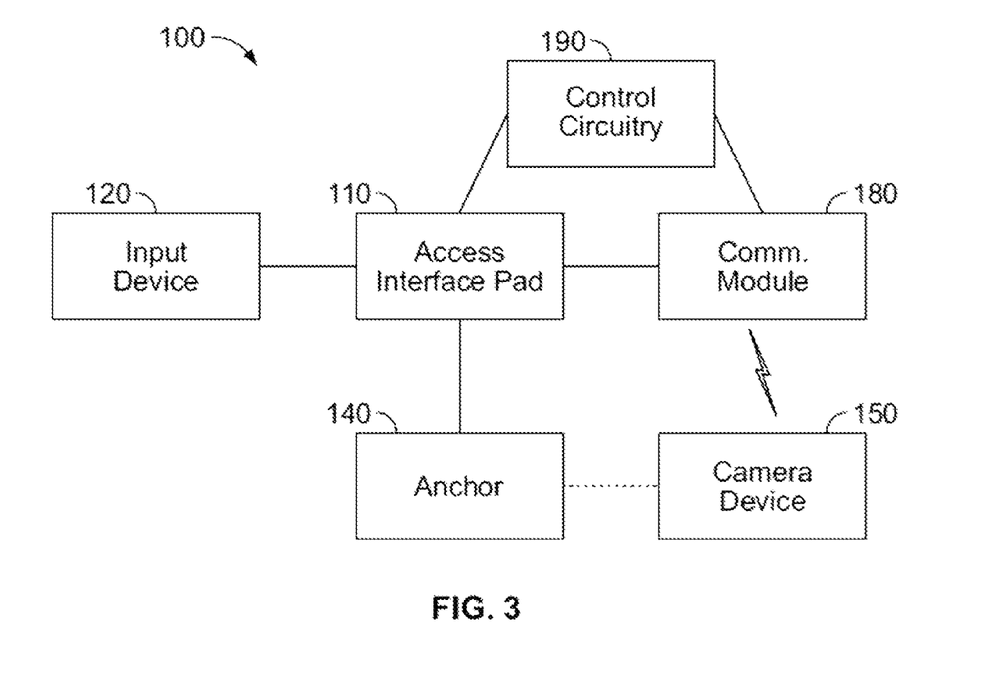
FIG. 3 is a block diagram illustrating various components of one example of a security system.

FIG. 3 is a block diagram showing an example of the interaction of various components of the security system 100. In one aspect, the security system 100 includes a communication module 180, which can be used to communicate with the remote computing device 50, the remote security authority 70, and the other components of the security system 100. The communication module can include a wireless antenna or other communication device that facilitates wireless communication with remote devices.

Control circuitry 190 communicates with the access interface pad 110 and the communication module 180 to control operation of the security system 100 and its various components. For example, the control circuitry 190 may operate software that receives, interprets, and responds to information received by the communication module 180 and that effects transmission of communications from the communication module 180 to remote computing devices 50 or to remote security authorities 70. The control circuitry 190 can also effect operation of various components of the security system. For example, the control circuitry 190 may control the operation of the anchor 140, the access interface pad 110, an alarm system, and/or a home surveillance system associated with the security system 100.

The security system 100 can also include an access interface pad 110. The access interface pad 110, which is shown in more detail in FIG. 4, includes an input device 120 and an anchor 140 releasably securing a camera device 150 to the access interface pad 110.

Figure 4:
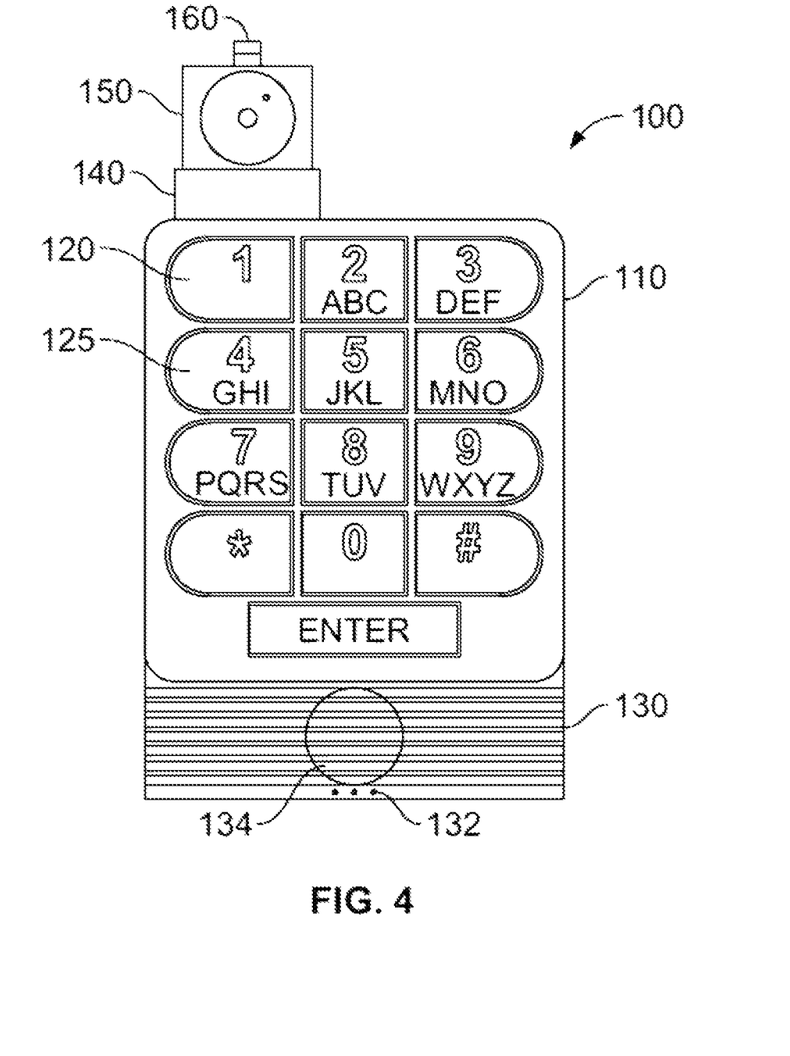
FIG. 4 shows an example of an access interface pad of a security system described in the present disclosure.

Through the input device 120, a visitor can enter visitor identification information, which the security system (e.g., via the control circuitry 190) can process to determine whether or not to authorize limited access to the building. Based on the visitor identification information, the control circuitry 190 can make a determination whether or not to authorize building access to the visitor.

The input device 120 of the access interface pad 110 can include a numeric keypad having a plurality of numeric keys that allows a visitor to punch in visitor identification information in the form of an access code, a passphrase, or another key code. Such an example input device 120 is shown in FIG. 4.

In FIG. 4, the input device 120 is a mechanical keypad with a plurality of physical buttons 125 that activate when punched or pressed by the visitor. In other examples, the input device 120 can include a touchscreen that has touch operable keys that allow a user to input visitor identification information.

In some approaches, the input device 120 can include a fingerprint scanner that allows visitors to input visitor identification information in the form of a fingerprint, thumbprint, handprint, or the like. The input device 120 can also include a retinal scanner configured to obtain retinal scans of a visitor. In some examples, the input device 120 can include a vocal recognition device that recognizes and/or identifies voices of authorized visitors.

In some embodiments, the input device 120 can additionally and/or alternatively include a card scanner (e.g., a bar code or QR code reader) or a fob reader (e.g., an NFC or RFID reader). In such an embodiment, a visitor may be able to provide visitor identification information by scanning a key card or a key fob that contains encoded visitor identification information.

In some examples, the input device 120 can include a digital camera (which may be the camera device 150). In this manner the security system 100 may either recognize the visitor (e.g., via facial recognition software operated by the control circuitry 190) or transmit images of the visitor 100 to a remote computing device for identification.

In one example, the control circuitry 190 of the security system 100 automatically authorizes or denies access to the secured building 10 based on the visitor identification information received at the access interface pad 110. For example, the control circuitry 190 can be configured to recognize one or more predetermined access codes that, when received via the input device 120, automatically result in building access being authorized.

In other examples, the control circuitry 190 can be configured to recognize fingerprints or retinal scans of certain authorized users such that when such a fingerprint or retinal scan is read, the security system 100 automatically authorizes the visitor with building access.

In some examples, certain visitor identification information will only be sufficient to authorize building access during certain times of day. For example, a particular access code handed out to a neighborhood parcel delivery person may only be sufficient to authorize building access between the hours of 8 am and 5 pm, Monday through Friday. In this manner, the security system 100 inhibits abuse of access code privileges during hours in which visitors are not needed.

In some approaches, the control circuitry 190 may effect communication with a remote computing device 50 in response to receiving the visitor identification information. For example, the visitor identification information may include a request for permission to access to the building that triggers communication between a remote computing device 50 and the access interface pad 110.

As noted, the visitor identification information received via the access interface pad 110 can be used to automatically grant or deny access to the building. In other examples, the security system 100 may not automatically authorize access, but may instead invoke permission from a remote operator (e.g., home or building owner operating a remote computing device) to authorize such access. That is, the visitor identification information received via the access interface pad 110 can be in the form of a building access request.

In response to receiving such a building access request, the security system 100 may communicate with the remote computing device 50, present the visitor identification information to the user, and solicit authorization of building access. Via the remote computing device 50, the remote operator may authorize or deny access and communicate such authorized or denied access to the security system 100. For example, the input device 120 can be used to contact the homeowner to initiate an audio and/or video conference. In this manner, the communication module 180 of the security system 100 can initiate communication between the remote computing device 50 (e.g., a homeowner's smart phone) and the access interface pad 110.

As shown in FIG. 4, the access interface pad 110 may include a communication system 130, which can include a microphone 132 and speaker 134 arrangement that allows visitors to communicate remotely with the building/home owner or resident. The communication system 130 may also include a video screen capable of providing video communication. The access interface pad 110 can utilize the camera device 150 to facilitate video communications, or it can utilize another separate camera that may be a part of the communication system 130.

The communication module 180 of the security system 100 can communicate with a remote computing device 50 (e.g., a cell phone, tablet device, laptop computer, etc.) so that the building owner can communicate with a visitor via the communication system 130.

In some approaches, the operator of the remote computing device 50 will be able to authorize or deny entry into the building remotely using the communication system 130. For example, using the communication system 130 of the access interface pad 110 and an interface of an application operating on a remote computing device 50, an operator can communicate with, or see visual images of, the visitor. Based on this communication, the operator can manually decide whether to authorize or deny building access.

The operator can control building access by sending a signal from the remote computing device 50. For example, a homeowner may recognize the visitor as a neighbor, a mailman, a home service technician, or another individual that the homeowner is comfortable authorizing with building access. The homeowner may then authorize limited building access by sending an authorization instruction via the remote computing device 50, for example, by touching an "authorize" key on the computing device 50 interface.

Authorizing access via the communication system 130 can be useful, for example, for visitors that do not visit a home often enough to warrant providing them with a specific access code. For example, where a homeowner is expecting a technician to arrive to provide in-home services (e.g., HVAC repair, electric meter readings, cable/internet installation, etc.), the homeowner may not be able to provide the visitor with a proper access code before the visit. However, after initiating a conference with the homeowner via the access interface pad 110, the visitor and the homeowner may both feel comfortable authorizing the visitor with limited access to the building.

The access interface pad 110 also includes an anchor 140 that releasably secures a wireless camera device 150 to the access interface pad 110. In some examples, the anchor 140 will release the camera device 150 from the access interface pad 110 in response to receiving an authorization signal from the control circuitry 190, indicating that building access has been authorized. For example, in response to the control circuitry 190 making a determination to authorize building access to a visitor, the anchor can release the camera device 150, thereby enabling the camera device 150 to be attached to the visitor.

Figure 5:
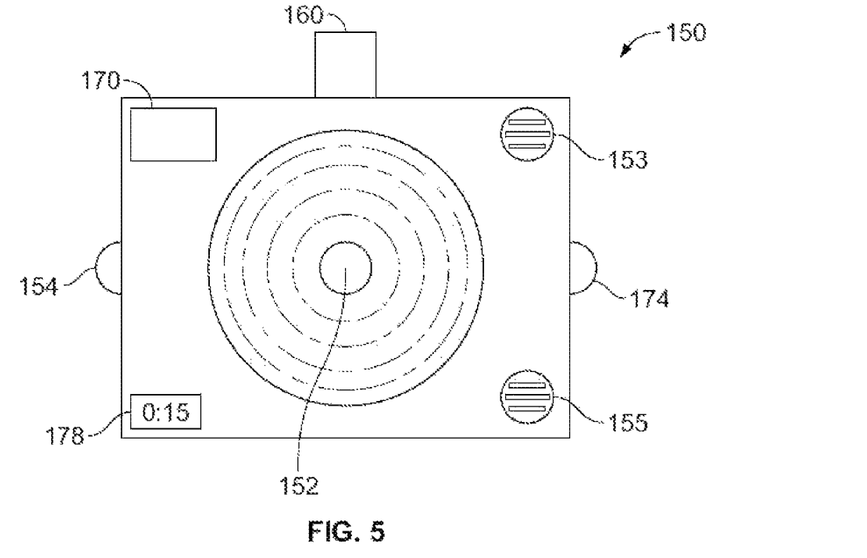
FIG. 5 shows an example of a camera device of a security system described in the present disclosure.

The camera device 150 is capable of capturing images. The images can be, or can include, still images, video images, audio data, and/or other data or information. In some examples, the camera device 150 wirelessly transmits the captured images to a security system and/or to a remote computing device 50.

In some examples, the camera device 150 may communicate directly with a personal computing device 50, but in other examples the camera device 150 communicates indirectly with the remote computing device 50 via the security system 100, or more specifically, through the communication module 180 of the security system 100. The wireless camera device 150 may also communicate directly with the security system 100, for example, to transmit information as to whether the camera device 150 has been properly attached to the visitor and the present location of the camera device 150.

The camera device 150 is releasably secured and/or attached to the access interface pad 110 via an anchor 140. The anchor 140 can be, for example, a clamp, a lock, a slot, a hole, a hook, and/or a moveable barrier that can hold, secure, and/or lock the camera device 150 in place on or in the access interface pad 110 when not in use. The anchor 140 can be equipped with a motorized mechanism that allows the anchor 140 to grab and release the camera device 150. In this manner, the anchor 140 permits the camera device 150 to be detached or removed from the access interface pad 110 in response to the security system 100 authorizing building access.

In some examples, in response to authorizing access, the control circuitry 190 will send a release instruction to the anchor 140, which release instruction effects the anchor 140 releasing the camera device 150 from the access interface pad 110 so that a visitor can wear the camera device 150. For example, in response to detecting that a visitor has entered a valid access code or passphrase via the access interface pad 110, the anchor 140 may release the camera device 150, thereby allowing the authorized visitor to place the camera device 150 on his or her clothing.

FIG. 5 shows an example of a camera device 150 used in accordance with security system 100. The camera device 150 include a lens 152 for capturing digital images. The camera can also include a microphone 153 for capturing sound. In some examples, the camera device can also include a speaker 155 that can produce sounds, thereby enabling communication between a visitor wearing the camera and the security system 100. The camera can also be equipped with an antenna 154 or some other wireless communication device that enables communication between the wireless camera device 150 and the security system 100 and/or other remote computing devices.

The camera device 150 can be equipped to attach to an authorized visitor, for example, via an attachment mechanism 160. The attachment mechanism 160 can comprise, for example, a clip, a clamp, a pin, a magnet, an adhesive, a hood and loop fastener, or the like.

In some aspects, the camera device 150 is equipped with one or more sensors 170 that detect whether the camera device 150 is attached and/or detached from the authorized visitor. For example, sensors 170 can include vibration sensors that discern whether the camera is on a person that is moving and breathing. The sensors 170 can also include body heat or capacitance sensors that measure body capacitance or body heat to determine whether the camera is attached to a person. The sensor can also include a heartbeat sensor that detects the heartbeat of a wearer. In approaches with one or more such sensors, access to the secured area optionally is not provided unless the camera device 150 detects that it has been attached to the visitor.

Some examples of the camera device 150 will include a tracking device 174 that monitors or tracks the position of the camera device 150 with respect to the security system 100. For example, the tracking device 174 can include a GPS transmitter, an antenna, RFID tracking tags, position sensors, Bluetooth, or the like.

In some embodiments, the security system 100 communicates with the remote personal device 50 (e.g., a cell phone, a tablet computer, a laptop computer, etc.) so that audio or visual data captured by the camera device 150 is transmitted to the personal device 50 in real time. For example, audio or visual data can be streamed to a user over the Internet, via a cellular signal or another communication technology.

In some examples, the security system 100 is equipped to continually and periodically collect, record, and/or transmit captured digital images while an authorized individual is within the building. For example, the security system may also include a data storage device such as a data chip or a hard drive capable of storing and/or logging information captured by the camera device 150.

In operation, the security system 100 can be used to monitor the activities of the authorized visitor through the camera device 150 in a variety of ways. In one example, the security system 100 detects the length of time that the camera device 150 has been removed from the access interface pad 10. For example, the system 100 can start a timer feature when the camera device 150 is removed and monitoring the time until the camera device 20 is returned to the access interface pad 10.

This length of time information can be transmitted remotely to a user, through the security system 100 to a remote computing device 50, for example. In this manner, the homeowner can be apprised of the length of time that an authorized individual is in the home.

So configured, the security system 100 can determine to terminate the authorization after a given amount of time. For example, where the authorized individual is a parcel delivery serviceman, the security system 100 (either automatically, or at the instruction of a remote user) may determine to terminate authorization to the home if the camera device 150 has not been returned to the access interface pad 110 within 2 minutes. After termination of authorization, the user and/or the security system 1 may contact the police or take other security measures as deemed appropriate. In some aspects the camera device 150 will be equipped with a time 178 display unit that notifies the visitor of the time remaining to safely return the camera device 150 back to the access interface pad 110.

In some examples, the security system 100 will detect and/or measure the separation distance between the camera device 150 and the access interface pad 110. For example, the security system 100 can use the tracking device 174 of the camera device 150 and/or other tracking equipment installed throughout the home, including video cameras, motion sensors, or the like, to detect the location of the camera device 150 with respect to the access interface pad 110. In some examples, the system 100 will determine what specific locations of the home or building that the camera device 150 is presently located in, for example, using GPS, RFID tracking, motion tracking techniques, or the like.

In other approaches, the security system 100 may monitor movement of the camera device 150 over time by monitoring images captured by the camera device 150 or by monitoring output of an optional vibration sensor disposed in the camera device 150. In this manner, the security system 100 may detect whether the camera device 150 has been removed from the visitor.

Figure 6:
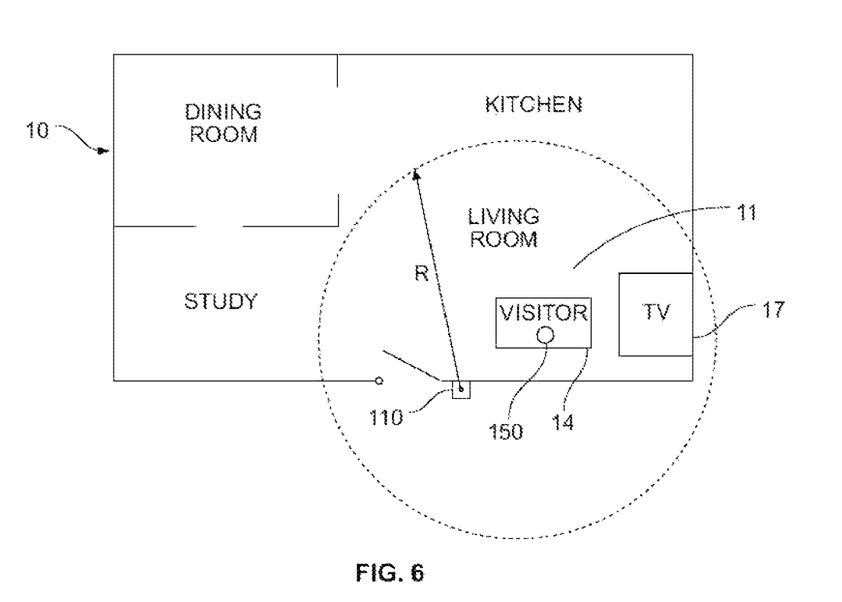
FIG. 6 is an example of a floorplan for a home equipped with a security system described in the present disclosure.

FIG. 6 is an example of a floorplan for a home equipped with a security system 100. In this floorplan, the security system 100 is configured to allow visitor 14 access to the home 10, provided that the visitor 14 stays within a distance R from the access interface pad 110.

In this example, the distance R is large enough to allow the visitor 14 to access the television 17 in the living room 11, but not large enough to allow the visitor to access other rooms of the house. Such a configuration could be particularly useful, for example, where the visitor 14 is a television or cable service repair person. So configured, the security system 100 can allow such a service provider with access necessary to accomplish a proper task, while also preventing the service provider from abusing the building access privileges.

In some aspects, the security system 100 will generate security criteria based on any combination of the above described and collected information. For example, location information can be transmitted remotely to a user through the security system 100 to a remote computing device 50 so that a homeowner can monitor the location of the authorized individual in real time. The homeowner may also elect to be notified if and when the authorized individual has entered certain rooms of the home, for example, the master bedroom.

In some embodiments, the security system 100 will authorize or deny access in the event of a failure of the camera device 150. For example, where the camera device 150 isn't working, the security system 100 may default to a setting that automatically refuses access to the building. In other examples, however, the security system 100 may contact a user remotely (e.g., by dialing the user's mobile phone) and offer the user the opportunity to authorize or deny access with knowledge that the camera functionality is inoperable.

In some embodiments, the security system 100 will activate security protocols if the security system 100 determines that one or more safety criteria have been violated. For example, the security system 100 may activate security measures if it detects that the camera device 150 is not returned to the access interface pad 110 within a predetermined time period.

The security system 100 may also activate security protocols if it determines that the detected separation distance between the camera device 150 and the access interface pad 110 exceeds a predetermined limit, for example, if an authorized visitor has stepped too far into the home away from the entryway 12.

In some aspects, the security system 100 will activate security protocols if it detects that the camera device 150 has been detached from the authorized individual or has not moved for a threshold amount of time.

In other examples, the security system 100 will activate security protocols if the security system 100 and/or the camera device 150 device detect the presence of unauthorized individuals entering or attempting to enter the building.

The security system 100 may also activate security protocols based on instructions provided by a remote user, for example, via a cell phone or other remote device.

The security system 100 can activate a variety of different security protocols depending on the situation and the circumstances triggering the activation. For example, security protocols may include activating an alarm, automatically unlocking and/or opening the door, automatically closing and/or locking the door, contacting a remote security authority 70 such as the police department or another local security entity, contacting the homeowner or resident, contacting a neighbor or other predetermined emergency contact, activating a home surveillance system, and/or communicate with the visitor via the access interface pad 110 and/or the camera device 150.

The present disclosure also provides a method of permitting limited remote access to a building for authorized visitors. The method uses a security system installed at or near a building entryway. For example, the method can involve using one or more embodiments of the security system 100 described herein with respect to FIGS. 1-6.

Figure 7:
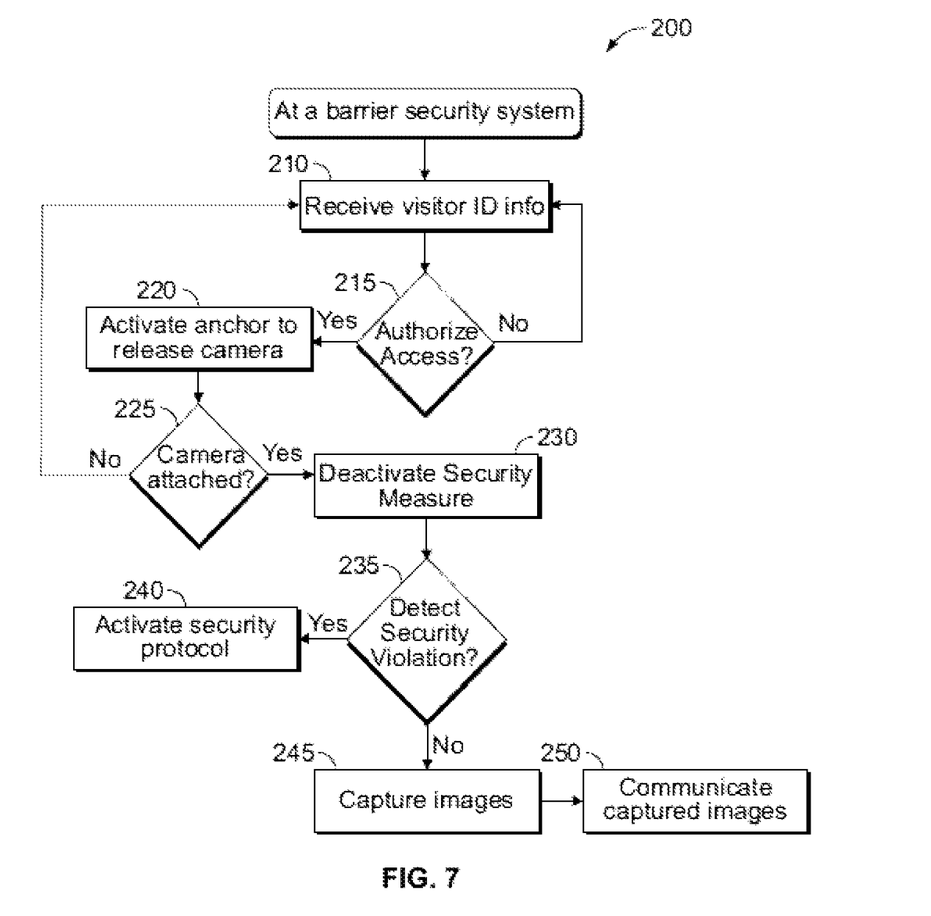
FIG. 7 is a flow-diagram of an example method for authorizing limited access to a building secured with a security system described in the present disclosure.

FIG. 7 is a flow-diagram of a method 200 for authorizing limited access to a building secured with a security system as described herein. The method takes place at a security system installed at or near an entryway to a building that includes an access interface pad with an anchor releasably securing a camera device to the pad.

At step 210, the method 200 receives visitor identification information at the security system. The visitor identification information can be received, for example, via an input device of the security system. The visitor identification information can be in the form of an access code, passphrase, or other key code entered at an alphanumeric keypad.

Additionally and/or alternatively, step 210 may obtain visitor identification information by scanning an individual's fingerprint or thumbprint or conducting a retinal scan or facial scan. The visitor identification information can also be a photograph or of the visitor captured by a camera, a vocal recording of the visitor captured by a microphone, or other information whereby the security system obtains evidence regarding the identification of the visitor at the entryway to the building.

In some embodiments, step 210 involves visually or audibly communicating with a remote user, and allowing the remote user to grant or deny authorization privileges. For example, the method may allow for oral and/or video communication between the access interface pad and a remote user via a mobile device. In this manner, the remote user can learn the identity and other information about the individual and make a decision to grant or deny access based upon that information.

At step 215, the method determines whether or not to authorize building access to the visitor. This determination can be based, at least in part, on the visitor identification information provided in step 210.

For example, where the visitor identification information is an access code, the method can compare the entered access code with a list of predetermined access codes to determine whether the visitor has entered an authorized code. If the visitor has entered an authorized access code, the method can proceed to step 220. If not, the security system refuses access, and awaits entry of further visitor identification information.

In some examples, the security system may activate a security measure in response to receiving visitor identification information that does not result in building access being authorized.

Optionally, at step 215, the method 200 uses the visitor identification information to actually identify the visitor. For example, a particular access code may be identified with a particular visitor. In this manner, the security system can present access restrictions that are suitable for that particular visitor. For example, where visitor identification information identifies the visitor as a parcel delivery person, the security system can proceed with access restrictions that do not permit the parcel delivery person to proceed more than 15 feet from the security system while access is authorized.

In some examples, step 215 can involve a security system automatically authorizing or denying building access, as described above. In other examples, however, step 215 can invoke the decision of a remote user. For example, the visitor identification information may include a request for access without offering any identifying characteristics. This can occur, for example, for new visitors that have not been to the building and have not previously been provided with access codes. In this manner, step 215 can involve communicating with a remote user, for example, via a remote communication device.

The security system can then facilitate communication between the user and the visitor and allow the user to make a determination as to whether or not to authorize building access. The security system can then monitor for an access instruction signal from the remote computing device.

For example, via an interface on the remote computing device, the user can communicate an access instruction signal to the security system that either authorizes or denies building access. In response to receiving an access instruction signal that authorizes building access, the method may then proceed to step 220. In response to receiving an access instruction signal that denies building access, the method may return to step 210.

At step 220, with building access having been already authorized, the security system activates the anchor to release the camera device from the access interface pad. The visitor may then take the camera device and attach it to his or her person, for example, by clipping the camera to the visitor's clothing.

At step 225, the method determines whether the camera device is properly attached to the visitor. This step can include using sensors, tracking devices, and other equipment on the camera, or by using other equipment associated with the security system, such as surveillance cameras or the like.

For example, step 225 may involve monitoring for body heat, body capacitance, heartbeat, or other vibrations that indicate that the camera is indeed attached to the visitor.

In another example, step 225 may involve a user operating a remote computing device sending a signal that indicates the camera device is properly attached. This can occur where the user remotely observes the visitor properly attach the camera via a real-time video signal recorded and communicated via the security system.

If the camera is not properly attached within a predetermined time period (e.g., 5 minutes), the method may revoke building access authorization. In this manner, the method may then proceed back to step 210, and require the return of the camera device to the access interface pad.

Additionally and/or alternatively, where building access authorization has been revoked, the method 200 may involve activating one or more security protocols, such as sounding an alarm or contacting a security authority.

If step 225 determines that the camera has been properly attached, the method can then deactivate a security measure at step 230. Deactivating a security measure can include deactivating or partially deactivating a security feature (e.g., an alarm), unlocking a door at the entryway, opening a door at the entryway, or "buzzing" the individual in.

Once the security measure is deactivated, the visitor will have access, or limited access to the building to perform the intended task. In some examples, method step 235 will include continually monitoring for and detecting security violations that occur while building access is authorized. Such security violations can include the visitor entering an unauthorized location of the house, the visitor travelling too far from the access interface pad, other unauthorized visitors entering the building, the authorized visitor removing the camera, the camera losing connectivity issues or becoming inoperative, the camera failing to provide clear images, the door failing to be closed and/or locked after the authorized visitor enters the building, and the camera device not being returned to the access interface pad within a predetermined amount of time.

In some examples, a security violation can be detected by a user viewing the image feed from the camera device via a remote computing device. That is, the user may determine that the visitor is not following a proper protocol and indicate that a security violation has occurred by communicating a security violation signal to the security system.

If a security violation is detected, step 240 will activate a security protocol. Such a security protocol can include activating an alarm, automatically unlocking and/or opening the door, automatically closing and/or locking the door, contacting a remote security authority such as the police department or another local security entity, contacting the homeowner or resident, contacting a neighbor or other predetermined emergency contact, activating a home surveillance system, and/or communicating with the visitor via the access interface pad and/or the camera device.

While the visitor is authorized with building access, the camera device will capture images at step 245. The captured images can include still images, videos, audio, date and time information, and/or other information generally obtainable with a camera. In some examples, the step 245 of capturing images can occur before, during, and after the occurrence of all other steps. For example, the method 200 may include capturing digital images with the camera device while the security system is receiving visitor identification information, while the anchor releases the camera, while the visitor attaches the camera, and while the visitor is within the secured building.

At step 250, the captured images are communicated in real time to a remote computing device, such as a smart phone, a tablet, or a laptop computer. In this manner, a homeowner can observe the images captured by the camera device while the visitor is authorized with access in the home.

In some examples, step 250 can involve communicating captured images directly from the camera device to a remote computing device. In other examples, step 250 may involve routing captured images from the camera device through the security system, to a remote computing device. In either event, the method 200 can communicate images captured by the camera device in real time to a user while an authorized visitor has access to the secured home.

As with step 245, in some examples, step 250 can occur throughout the entire process. That is, step 250 can involve communicating each image in real time as the images are captured by the camera device.

In some examples, upon completion of the in-home service or expiration of the authorized building access period, the visitor will be instructed to return to the keypad. In some situations the visitor can re-enter an access code (e.g., a departure access code) or return the camera device to the anchor.

In some examples, the security system can be programmed so that it will not activate a security protocol if the camera is returned to a location within the vicinity of the keypad, even if it is not entirely secured by the anchor. This feature can be achieved by various method, for example, by using proximity techniques (e.g., RFID radio, capacitive or magnetic sensing, Bluetooth, etc.) or by comparing the images obtained by the camera device to those captured by a camera while properly stored on the anchor. In this manner, an improperly returned or restored camera may not unnecessarily activate an unnecessary security protocol.

Those skilled in the art will recognize that a wide variety of modifications, alterations, and combinations can be made with respect to the above described embodiments without departing from the scope of the invention as set forth in the claims, and that such modifications, alterations, and combinations are to be viewed as being within the ambit of the inventive concept.

The invention claimed is:

1. A security system that authorizes limited access to a building, the security system comprising:
   an access interface pad having an input device configured to receive visitor identification information;
   a wireless camera device that captures images and wirelessly transmits captured images;
   a communication module in communication with the access interface pad and the wireless camera, the communication module configured to communicate wirelessly with a remote computing device; and
   an anchor releasably securing the camera device to the access interface pad;
   wherein the security system is configured to authorize or deny limited access to the building in response to the access interface pad receiving visitor identification information, wherein the anchor is controlled to release the camera device from the access interface pad in response to the security system authorizing access to the building,
   and wherein the security system is configured to communicate images captured by the released camera device to the remote computing device.

2. The security system of claim 1, wherein the security system communicates the images to the remote computing device in real time.

3. The security system of claim 1, wherein the input device comprises at least one of a numeric keypad, a touch sensitive screen, a fingerprint scanner, a retinal scanner, a card scanner, a fob reader, or a digital camera.

4. The security system of claim 1, wherein the visitor identification information includes an access code entered via the input device.

5. The security system of claim 4, wherein the security system is configured to authorize limited access into the building when the visitor identification information includes at least one access code that matches a predetermined access code.

6. The security system of claim 1, wherein the communication module is further configured to receive access instruction signals from the remote computing device, and wherein the security system is configured to authorize limited access in response to the communication module receiving an access instruction signal from the remote computing device.

7. The security system of claim 6, wherein the visitor identification information includes a building access request, and wherein the security system is configured to communicate the visitor identification information to the remote computing device in response to the access interface pad receiving a building access request.

8. The security system of claim 7, wherein the access interface pad further comprises an audio communication system comprising a microphone and a speaker, wherein the audio communication system and the communication module enable real time audio communication between the access interface pad and the remote computing device.

9. The security system of claim 1, wherein, during the time period when building limited access is authorized, the camera device continually or periodically captures images and the security system continually or periodically communicates the captured images to the remote computing device.

10. The security system of claim 1, wherein the camera device comprises an attachment mechanism that facilitates attaching the camera device a visitor that has been authorized access to the building.

11. The security system of claim 10, wherein the camera device comprises a sensor that detects whether the camera is attached to or detached from a person.

12. The security system of claim 11, wherein the sensor is configured to measure at least one of body capacitance and body heat to detect whether the camera device is attached to or detached from the person based on the measured body capacitance or body heat.

13. The security system of claim 11, wherein the security system is configured to activate an alarm in response to the sensor detecting that the camera device has been detached from a person.

14. The security system of claim 1, wherein the camera device comprises a vibration sensor that detects movement of the camera device, wherein the camera device is configured to communicate information from the vibration sensor to the communication module.

15. The security system of claim 14, wherein the security system is configured to activate at least one security protocol in response to the camera device communicating information from the vibration sensor indicating that the camera device has not moved for a time period exceeding a minimum threshold.

16. The security system of claim 1, wherein the security system is configured to activate at least one security protocol in response to the camera device not being returned to the access interface pad within a predetermined period of time.

17. The security system of claim 1, wherein the camera device includes a tracking device, wherein the security system is configured to use the tracking device to detect a separation distance between the camera device and the access interface pad, and wherein the security system is configured to activate at least one security protocol in response to the security system detecting that the separation distance between the camera device and the access interface pad exceeded a predetermined limit.

18. The security system of claim 1, wherein the security system is configured to at least one of unlock or open a door positioned in the entryway.

19. The security system of claim 18, wherein the security system is configured to unlock or open the door in response to the communication module receiving an open instruction from the remote computing device.

20. A method of authorizing limited access to a building, the method comprising:
   receiving visitor identification information via an access interface pad that includes a wireless camera device releasably secured to the pad via an anchor;

determining whether to authorize limited access to the building based at least in part on the visitor identification information received via the access interface pad;

in response to determining to authorize access to the building, activating the anchor to release the camera device from the access interface pad and beginning a period of authorized limited access;

detecting whether the camera device has been attached on a person;

in response to detecting that the camera device has been attached on a person, temporarily deactivating at least one building security measure;

capturing digital images with the camera device during the period of authorized limited access; and communicating information obtained by the camera device to a remote computing device.

21. The method of claim 20, further comprising:
detecting whether at least one safety criteria has been violated; and
in response to detecting that a safety criteria has been violated, activating at least one safety protocol.

22. The method of claim 21, wherein the determining whether at least safety criteria has been violated comprises detecting a separation distance between the camera device and the access interface pad, monitoring a time period that the camera device has been removed from the access interface pad, and monitoring a time that the camera device is not moving.

23. The method of claim 20, wherein temporarily deactivating at least one building security measure includes at least one of deactivating a building security alarm, unlocking a door to the building, and opening a door to the building.

* * * * *